W. P. Penn.
Mower.
Nº 44452. Patented Sep. 27, 1864.

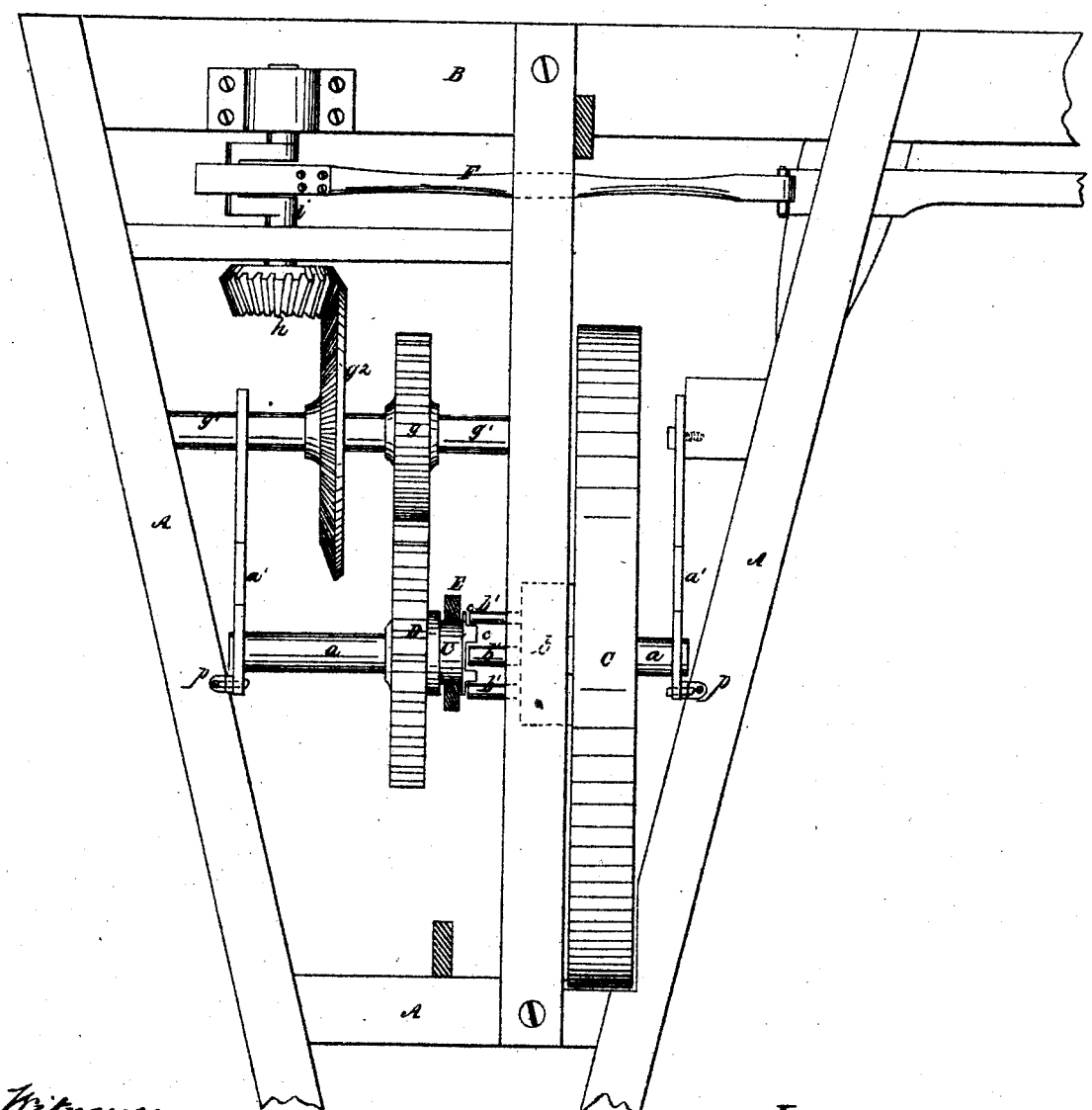

Witnesses.
R. T. Campbell
E. Schafer

Inventor.
W. P. Penn
by his atty.
Mason, Fenwick & Lawrence

UNITED STATES PATENT OFFICE.

WORDEN P. PENN, OF BELLEVILLE, ILLINOIS.

IMPROVEMENT IN HARVESTERS.

Specification forming part of Letters Patent No. 44,452, dated September 27, 1864.

*To all whom it may concern:*

Be it known that I, WORDEN P. PENN, of Belleville, St. Clair county, State of Illinois, have invented a new and useful Improvement in Harvesting-Machines; and I do hereby declare that the following is a full, clear, and exact description thereof, reference being had to the accompanying drawings, making a part of this specification, in which—

Figure 3:
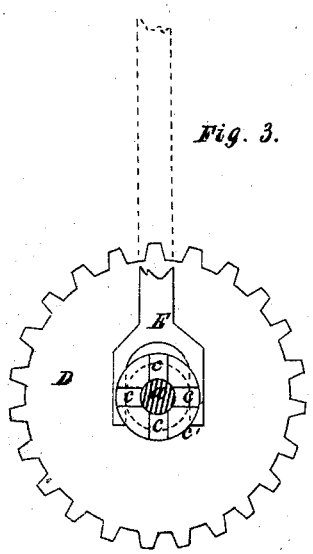
Figure 4:
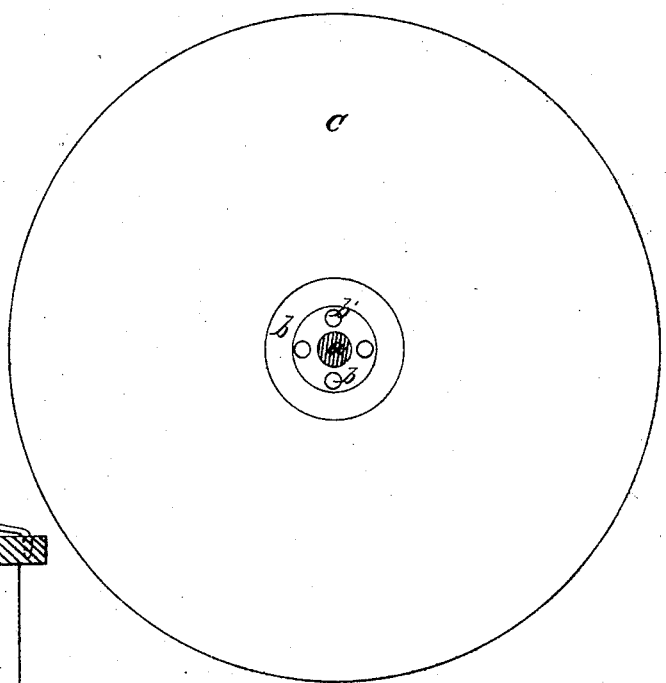
Figure 2:
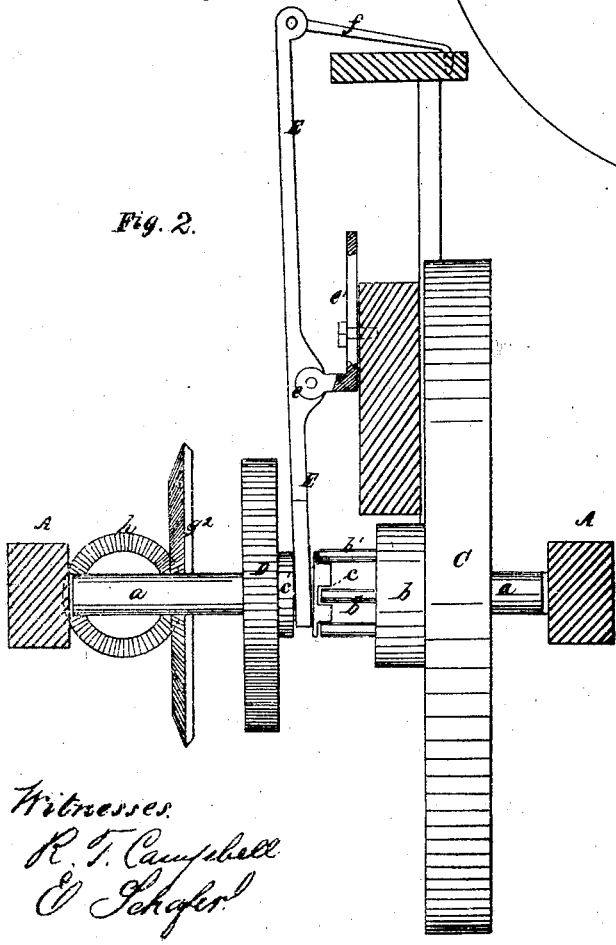

Figure 1 is a top view of a portion of the frame and the driving-gear of a harvester having my invention applied to it. Fig. 2 is a vertical transverse section through Fig. 1. Fig. 3 is a side view of the main spur-wheel, having the notched hub and forked lever applied to it. Fig. 4 is a side view of the main supporting-wheel, having teeth formed on its hub.

Similar letters of reference indicate corresponding parts in the several figures.

This invention, which is applicable to reaping or mowing machines, has for its object the throwing into and out of gear the machinery driving the cutting apparatus of a single-wheel adjustable-frame machine by means of an exceedingly durable and simple contrivance which is under the control of the driver, who can effect the object in view, whether the machine is in motion or at rest, by simply moving a lever back and forth, as will be hereinafter described.

To enable others skilled in the art to make and use my invention, I will describe its construction and operation.

I have represented in the accompanying drawings only those parts of a reaping-machine which I deem sufficient to illustrate the application and operation of my invention.

A represents a triangular frame, and B the rear brace thereof, which latter may either form a part of the finger-bar or serve as a support for this bar.

C represents the driving-wheel, which supports the frame of the machine, and $a$ is the horizontal transverse axle of said wheel, which has end bearings in the two adjustable segments $a'$ $a'$. The large wheel C is keyed to and turns its axle, and on the hub $b$ of this wheel spurs $b'$ are formed, as shown clearly in Figs. 1, 2, and 4, which are intended to engage with depressions $c c$, that are made in the hub $c'$ of a large spur-wheel, D, and lock or engage this wheel to the driving-wheel C when the machine is cutting. The wheel D is applied loosely on its shaft $a$, and can be moved back and forth toward or from the wheel C for the purpose of engaging these two wheels, and to enable the driver to effect these movements a forked lever, E, the lower end of which embraces the annular groove in hub $c'$, is pivoted at $e$ to an adjustable bracket, $e'$, which is secured to a portion of frame A, as shown in Fig. 2. The lever E extends up to a point where it can be conveniently grasped by the driver, sitting in his seat on the machine. A hooked rod, $f$, may be pivoted to the upper end of the lever E for the purpose of enabling the driver to establish the wheel D in the desired position. I have represented pins projecting from the hub of wheel C, and corresponding recesses in the hub of the wheel D; but I do not confine myself to a clutch formed exactly in this manner, as teeth of various shapes will be found to answer the end in view, provided these teeth are adapted to enter depressions formed in the side of wheel D. The spur-wheel D engages at all times with the teeth of a pinion spur-wheel, $g$, which is keyed to a transverse shaft, $g'$, that has its bearings in one of the side beams of the frame A and intermediate board, Z, and said shaft $g'$ carries a large bevel spur-wheel, $g^2$, which engages with and gives motion to a pinion-wheel, $h$. The pinion-wheel $h$ is keyed on the end of a crank-shaft, $i$, which gives motion to the sickle through the medium of pitman F, and the sickle thus performs its cutting-strokes.

When the machine is moving along and it is desired to instantly stop the motion of the sickle the driver has only to move the upper end of the lever E toward him, which operation disengages the two wheels C D and allows the wheel D to remain stationary on its shaft $a$; and when it is desired to start the sickle again the driver moves the upper end of the lever E outward, and thus brings the wheel D into gear with C again.

As before stated, the shaft of the main wheel C has its bearings in the two segments $a'$ $a'$. It will be seen by reference to Fig. 1, wherein the segments are shown, that these segments have their axis of motion coincident with the axis of the transverse shaft $g'$. This being the case, the axis of the spur-wheel D or its shaft $a$ will move in the arc of a circle concentric with the axis of motion of the shaft $g'$, and hence the wheel D will always remain in gear with the wheel $g$, whether wheel D be adjusted laterally to disengage it from wheel C, or whether the frame of the machine be raised or depressed.

The bracket $e'$, which serves as the fulcrum-connection for the lever E, is made vertically adjustable for the purpose of accommodating the lower forked end of said lever to the position of the axle $a$ when adjusted up or down, for in order to adjust the frame of the machine the segment-connections $a'$ $a'$ must be loosened at the points $p$ $p$ and the connections made at other points.

By the contrivance which I have above described it will be seen that I am enabled to employ a train of wheel-work for communicating motion to the pitman crank-shaft $i$ from the single drive-wheel C to raise or depress the frame of the machine, and finally to apply a lever to the hub of wheel D for throwing it out of and into gear whenever desired, and to adapt this lever E to the changes or adjustments of the main frame. Lever E can be applied so as to connect with hub of wheel D on the reverse or opposite side, and its fulcrum-support placed upon the axle $a$ and fastened to the journal-box upon segment $a'$. In this way the necessity of adjusting lever E when raising or depressing frame A would be obviated.

In my invention I do not restrict myself to an adjustable frame, as the cutting apparatus only may be made adjustable; nor do I confine myself to the construction shown of wheels C, D, $g$, $g^2$, and $h$, as they can be varied and answer the same purpose.

Having thus described my invention, what I claim as new, and desire to secure by Letters Patent, is—

1. The combination of lever E, frame A, clutch $b'$ $c$, and laterally-sliding wheel D with the wheels $g$, $g^2$, and $h$, arranged, and operating substantially as described, or their equivalents.

2. In a single-wheel adjustable-frame machine, the use of adjustable lever E with the clutch-wheels C D, and means applied to said lever for establishing it in the desired position.

W. P. PENN.

Witnesses:
JABEZ J. PIGGOTT,
LOUIS P. KRAFFT.